(12) United States Patent
Nakamura

(10) Patent No.: US 7,665,040 B2
(45) Date of Patent: Feb. 16, 2010

(54) INFORMATION PROCESSING APPARATUS UTILIZING REAL IMAGE DATA

(75) Inventor: Shigeo Nakamura, Kobe (JP)

(73) Assignee: Fujitsu Ten Limited, Kobe (JP)

(*) Notice: Subject to any disclaimer, the term of this patent is extended or adjusted under 35 U.S.C. 154(b) by 931 days.

(21) Appl. No.: 10/382,643

(22) Filed: Mar. 7, 2003

(65) Prior Publication Data
US 2003/0214532 A1    Nov. 20, 2003

(30) Foreign Application Priority Data
Mar. 14, 2002   (JP) .............................. 2002-070643

(51) Int. Cl.
G06F 3/00 (2006.01)
(52) U.S. Cl. ..................................... 715/835
(58) Field of Classification Search .................. 715/835
See application file for complete search history.

(56) References Cited

U.S. PATENT DOCUMENTS

| | | | | |
|---|---|---|---|---|
| 6,377,210 | B1 * | 4/2002 | Moore | 342/357.13 |
| 6,466,856 | B2 | 10/2002 | Schmitt | |
| 6,691,114 | B1 * | 2/2004 | Nakamura | 707/10 |
| 6,882,350 | B2 * | 4/2005 | Asami | 345/638 |
| 2001/0040629 | A1 | 11/2001 | Miyagi et al. | |
| 2003/0078724 | A1 * | 4/2003 | Kamikawa et al. | 701/208 |

FOREIGN PATENT DOCUMENTS

| | | |
|---|---|---|
| JP | A-8-123658 | 5/1996 |
| JP | A-9-33275 | 2/1997 |
| JP | A-10-39748 | 2/1998 |
| JP | A-10-307532 | 11/1998 |
| JP | A-11-282864 | 10/1999 |
| JP | A-11-353582 | 12/1999 |
| JP | A-2000-310940 | 11/2000 |
| JP | A-2001-249024 | 9/2001 |
| JP | A 2001-317949 | 11/2001 |
| JP | A-2001-324336 | 11/2001 |
| KR | A-2001-0070363 | 7/2001 |
| WO | WO 00/30057 | 5/2000 |

* cited by examiner

Primary Examiner—Ryan F Pitaro
(74) Attorney, Agent, or Firm—Oliff & Berridge, PLC

(57) ABSTRACT

An information processing apparatus has a first section for specifying a selection range with respect to a real image displayed on a display screen, a second section for acquiring image data corresponding to the real image in the specified selection range, a third section for obtaining a spot specified by user based on an input item when the user inputs a specific item such as name and location by which the spot such as a facility can be determined, and a fourth section means for obtaining a display position of a real image of the obtained spot. Based on the obtained position, an area containing the real image of the spot specified by the user is specified as the selection range.

15 Claims, 14 Drawing Sheets

FIG. 3

| SPOT NUMBER | SPECIFIC DATA | | IMAGE DISPLAY POSITION DATA | | LINK DATA |
|---|---|---|---|---|---|
| | NAME | LOCATION | IMAGE NUMBER | COORDINATE | |
| NS1 | OX TOWER | Z-Z-Z, XXX-CHOU, OO-KU, KOUBE-SHI | NP1 | (x1, y1), (x2, y2) | (X1, Y1) |
| NS2 | YY MUSEUM | Y-Y-Y, XXX-CHOU, OO-KU, KOUBE-SHI | NP1 | (x3, y3), (x4, y4) | (X2, Y2) |

FIG. 19
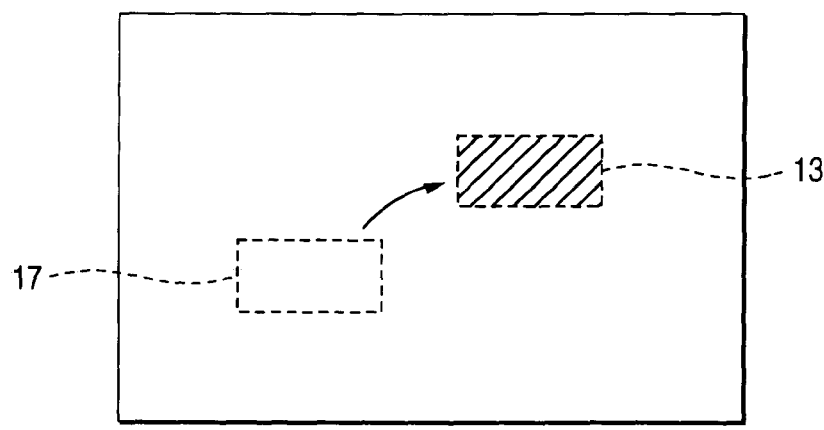
FIG. 20
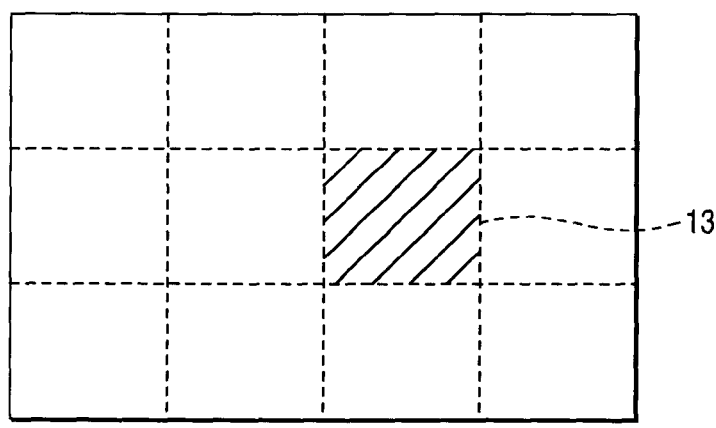
FIG. 21
| SPOT NUMBER | IMAGE DISPLAY POSITION DATA | | LINK DATA |
|---|---|---|---|
| | IMAGE NUMBER | COORDINATE | |
| $NS_1$ | $NP_1$ | $(x_1, y_1), (x_2, y_2)$ | $(X_1, Y_1)$ |
| $NS_2$ | $NP_1$ | $(x_3, y_3), (x_4, y_4)$ | $(X_2, Y_2)$ |

INFORMATION PROCESSING APPARATUS UTILIZING REAL IMAGE DATA

The present disclosure relates to the subject matter contained in Japanese Patent Application No. 2002-070643 filed on Mar. 14, 2002, which is incorporated herein by reference in its entirety by reference.

BACKGROUND OF THE INVENTION

1. Field of the Invention

This invention relates to an information processing apparatus and more particularly to an information processing apparatus suited for being adopted in a navigation system, etc., installed in a vehicle, for example.

2. Description of the Related Art

Hitherto, a navigation system has been able to display a map on a screen of a display based on road map data recorded in a DVD-ROM, etc., and further able to display a position of the vehicle installing the navigation system on the map and guide the driver along a route to a destination based on position data of the navigation system.

Landmarks such as banks, convenience stores, filling stations, etc., are displayed as particular marks, whereby easy-to-see display is produced.

However, in the navigation system in the related art, the displayed particular marks are simplified display and a points where the particular marks are displayed are determined in advance; sufficient display is not necessarily provided. Thus, development of a navigation system that can display an image suiting the user's taste in a location desired by the user is desired.

By the way, recently a navigation system for displaying a real image such as a satellite photograph and an aerial photograph, which show the surface of the Earth, on a display screen and superposing the position of the navigation system, etc., on the real image has been proposed.

Then, the inventor thought that the level of user satisfaction was able to be enhanced if a real image in conformity to the user's taste was input from the displayed satellite photograph, etc., and the input image was displayed on a conventional road map.

However, the navigation system usually is installed in a vehicle and has a limited interface unlike a personal computer and image input operation, etc., needs to be simplified, which is very difficult to accomplish.

SUMMARY OF THE INVENTION

It is therefore an object of the invention to provide an information processing apparatus suited for being adopted in a navigation system, etc., for enabling the user to input an image in conformity to the user's taste by simple operation.

To the end, according to a first aspect of the invention, there is provided an information processing apparatus including a image data storage section for storing image data corresponding to a real image, a display unit having a display screen, a first display control section for displaying the real image on the display screen based on the image data, a selection range specification section for specifying a selection range with respect to the real image displayed on the display screen, a first image data acquisition section for acquiring the image data corresponding the real image in the selection range, which is specified by the selection range specification section, a specific data storage section for storing specific data corresponding to a specific item, which can specify a spot, an input section for inputting the specific item, a first spot calculation section for obtaining a spot corresponding to the specific item inputted by the input section, an image display position data storage section for storing image display position data indicating a position where the real image of the spot, and an image display position calculation section for obtaining a position where the real image of the spot obtained by the first spot calculation section, based on the image display position data stored by the image display position data storage section. The selection range specific section specifies the selection range based on the position obtained by the image display position calculation section to contain the real image of the spot.

According to the first aspect of the invention, when the selection range is specified for the real image displayed on the display screen, the image data corresponding to the real image in the specified selection range can be acquired. Since the selection range is specified based on the specific item input by the user, the image data corresponding to the real image specified by the user (namely, the image desired by the user) can be acquired.

Therefore, for example, if the information processing apparatus is adopted for the navigation system, a real image to the user's taste can be put on the goal point of the guidance route (namely, the destination), the user's home, etc., on the road map displayed on the display screen, so that the navigation system can be provided with very high added value.

Next, a processing flow relevant to specification of the selection range will be discussed.

a) First, when the user enters the specific item (for example, the name or the location of a facility) by which the spot such as a facility can be determined, the user-specified spot is obtained based on the entered specific item.

b) If the user-specified spot is found, the display position of the real image of the spot (for example, the coordinate position on the display screen) is obtained.

c) Then, the selection range is specified so as to contain the real image of the spot based on the display position of the real image of the user-specified spot.

As shown above in a) to c), to specify the selection range, the user needs only to enter the specific item. Therefore, the image data corresponding to the image desired by the user can be acquired by simply operation.

A voice input unit is adopted as the input unit of the information processing apparatus according to the first aspect, whereby the user needs only to produce voice without operating any key, so that operability can be improved.

According to a second aspect of the invention, there is provided an information processing apparatus including a image data storage section for storing image data corresponding to a real image, a display unit having a display screen, a first display control section for displaying the real image on the display screen based on the image data, a selection range specification section for specifying a selection range with respect to the real image displayed on the display screen, a first image data acquisition section for acquiring the image data corresponding the real image in the selection range, which is specified by the selection range specification section, and a pointing device for inputting coordinate position data. The selection range specification section specifies the selection range based on the coordinate position data.

According to the second aspect, when the selection range is specified for the real image displayed on the display screen, the image data corresponding to the real image in the specified selection range can be acquired. Since the selection range is specified by the user using the pointing device, the image data corresponding to the real image specified by the user (namely, the image desired by the user) can be acquired.

Therefore, for example, if the information processing apparatus is adopted for the navigation system, a real image to the user's taste can be put on the goal point of the guidance route (namely, the destination), the user's home, etc., on the road map displayed on the display screen, so that the navigation system can be provided with very high added value.

To specify the selection range, the user needs only to specify the coordinate position through the pointing device (for example, a mouse, a trackball, a light pen, a joystick, a touch screen, etc.,). Therefore, the image data corresponding to the image to the user's taste can be acquired by simple operation.

As the selection range, for example, the following selection ranges a) to c) are named:

a) a case in which the selection range is the area surrounded using the pointing device (see FIG. 16). When the user uses the pointing device to surround an image in the real image displayed on the display screen, the image data corresponding to the surrounded image (namely, image to the user's taste) can be acquired.

b) a case in which the selection range is the area in the frame formed based on a predetermined condition with one point specified by using the pointing device as the reference point (see FIG. 17).

For example, when the frame is a preset rectangular frame with the reference point as the center and the user uses the pointing device to specify the vicinity of the center of any desired image in the real image displayed on the display screen, the image data corresponding to the image containing the desired image (namely, image to the user's taste) can be acquired.

c) a case in which the selection range is the area in the frame formed based on a predetermined condition with two points specified by using the pointing device as the reference points (see FIG. 18).

For example, when the upper part, the lower part, the left side, and the right side of the frame are determined by the two points as the reference points and the user uses the pointing device to specify the upper-left corner and the lower-right corner of any desired image in the real image displayed on the display screen, the image data corresponding to the image containing the desired image (namely, image to the user's taste) can be acquired.

In the image processing apparatus according to the second aspect, the selection range specification section may display a frame indicating a predetermined area on the real image displayed on the display screen and further the display position of the frame may be made movable using the pointing device, whereby the area indicated by the frame after being moved is specified as the selection range (see FIG. 19).

According to a third aspect of the invention, in the information processing apparatus of the second aspect, the selection range specification section divides the real image displayed on the display screen into a plurality of areas. The selection range is at least one of the plurality of areas specified by the pointing device from the plurality of areas.

According to the third aspect, the real image displayed on the display screen is divided into a plurality of areas and the selection range is one or more areas selected by using the pointing device from among the plurality of areas (see FIG. 20), so that if the user uses the pointing device to select the area containing any desired image from among the plurality of areas, the image data corresponding to the desired image (namely, image to the user's taste) can be acquired. Therefore, the image data corresponding to the image to the user's taste can be input by simple operation.

According to a fourth aspect of the invention, there is provided an information processing apparatus including a image data storage section for storing image data corresponding to a real image, a display unit having a display screen, a first display control section for displaying the real image on the display screen based on the image data, an image display position data storage section for storing image display position data indicating a position where the real image of a spot is displayed, a pointing device for inputting coordinate position data on the display screen, a second spot calculation section for obtaining a post specified by the pointing device based on the image display position data and the coordinate position data, and a second image data acquisition section for acquiring the image data corresponding to the real image of the spot based on the position obtained by the second spot calculation section.

According to the fourth aspect, if the user uses the pointing device to specify any desired spot, the image data corresponding to the real image of the specified spot (namely, image desired by the user) can be acquired.

Therefore, for example, if the information processing apparatus is adopted for the navigation system, the real image to the user's taste can be put on the goal point of the guidance route (namely, the destination), the user's home, etc., on the road map displayed on the display screen, so that the navigation system can be provided with very high added value.

To specify the spot, the user needs only to specify the coordinate position on the display screen using the pointing device. Therefore, the image data corresponding to the image desired by the user can be acquired by simple operation.

In any of the information processing apparatus according to the first to fourth aspects, a touch screen may be adopted as the pointing device, whereby the information processing apparatus can be made very excellent in operability. In a vehicle, it is very burdensome and difficult to operate a switch key, etc. Thus, if the information processing apparatus is adopted for a navigation system installed in a vehicle, full use of the advantages of the information processing apparatus can be made still more.

According to a fifth aspect of the invention, the information processing apparatus of any one of the first, second, and fourth aspects further includes a road map data storage section for storing road map data. The image data storage section further stores link data so that the image data is linked to the road map data stored by the road map data storage section. The first or second image data acquisition section for acquiring the link data when the first or second image data acquisition section acquires the image data.

According to the fifth aspect, when the image data corresponding to the real image of the spot specified by the user is acquired, the link data with the road map data is acquired together. Therefore, it is made possible to easily display the real image of the spot in association with the road map.

According to a sixth aspect of the invention, in the information processing apparatus of the fifth aspect, wherein the display unit displays road map on the display screen based on the road map data. The information processing apparatus of the sixth aspect, further includes a second display control section for displaying on the road map the real image corresponding to the image data acquired by the first image data acquisition section based on the link data.

According to the sixth aspect, the real image (namely, the real image of the spot specified by the user) can be displayed in the place of the spot on the road map. Therefore, the user need not perform operation of finding the place of the spot and putting the real image thereon, so that the apparatus very excellent in operability can be provided.

According to a seventh aspect of the invention, in the information processing apparatus of the fifth aspect, the display unit displays road map on the display screen based on the road map data. The information processing apparatus of the seventh aspect, further includes a third display control section for displaying map the real image corresponding to the image data acquired by the first image data acquisition section at a predetermined position on the road map.

According to the seventh aspect, the real image (namely, the real image of the spot specified by the user) can be displayed at a predetermined point on the roadmap (for example, the destination or the user's home). Therefore, the real image to the user's taste can be put on the place indicating the goal point of the guidance route, the user's home, etc., on the road map According to an eighth aspect, the information processing apparatus of anyone of the first, second, and fourth aspects, further includes a spot information registration control section for registering information of a spot, which user desires to register. The image data acquired by the first or second image data acquisition section is contained in data registered as the information of the spot.

According to the eighth aspect, the image data corresponding to the real image (namely, the real image of the spot specified by the user) is contained in the data registered as the information of the spot, so that the information of the spot can be expanded.

According to a ninth aspect of the invention, the information processing apparatus of the eighth aspect further includes a first spot information presentation section for presenting the information of the spot to the user based on the registered data. The first spot information presentation section displays the real image corresponding to the image data.

According to the ninth aspect, as the information of the spot, the real image of the spot can be displayed, so that the expanded spot information can be provided for the user.

According to a tenth aspect of the invention, the information processing apparatus of the eighth aspect, further includes a spot selection section for selecting a plurality of spots based on a predetermined condition from spots registered as the spot information, and a second spot information presentation section for presenting the information of the plurality of spots selected by the spot selection section to the user. The second spot information presentation section displays the real image corresponding to the image data.

According to the tenth aspect, a plurality of spots, for example, as candidates for the destination are selected based on a predetermined condition from among spots registered as the spot information, and the information of the selected spot is presented to the user. As the information of the spot, the real image of the spot is displayed, so that the user can see the displayed real image before determining the destination. Therefore, the user can drive more enjoyably.

According to an eleventh aspect of the invention, in the information processing apparatus of any one of the first, second, and fourth aspects, the image data storage section stores the image data corresponding to the real images of each spot in response to various conditions, and condition data indicating the various conditions with being related to the image data. The first or second image data acquisition section acquires a plurality of image data corresponding to the real images of each spot in response to the various conditions, and the condition data. The information processing apparatus of the eleventh aspect further includes a fourth display control section for displaying the real image corresponding to the image data acquired by the first or second image data acquisition section on the display screen based on a condition at a predetermined time and the condition data.

According to the eleventh aspect, two or more real images of the spot specified by the user are input in response to the various circumferences (for example, season) and the circumference data can be acquired. Further, the real image corresponding to the acquired image data can be displayed on the display screen based on the circumference at a predetermined point in time and the circumference data.

Therefore, the real image responsive to the season, etc., can be displayed. For example, to display a specific mountain specified by the user, if the current season is the spring, the mountain where cherry blossoms are blooming can be displayed; if the season is the winter, the mountain where snow is fallen can be displayed, so that emotional images can be displayed.

According to a twelfth aspect of the invention, the information processing apparatus of any one of the first, second, and fourth aspects, further includes a road map data storage section for storing road map data, a fifth display control section, and a sixth display control section. The display unit displays roadmap and a position of the information processing apparatus on the display screen based on the road map data. The fifth display control section displays the real image corresponding to the image data acquired by the first or second image data acquisition section at a predetermined position on the road map. The sixth display control section changes a display mode of the real image based on correlation between the position of the information processing apparatus on the road map and the predetermined position.

According to the twelfth aspect, the real image (namely, the real image of the spot specified by the user) can be displayed at a predetermined position on the road map. Furthermore, change can be added to the display mode of the real image based on the relationship between the position of the information processing apparatus on the road map and the predetermined position. For example, when the information processing apparatus approaches the predetermined position, the real image is displayed on an enlarged scale or is blink-displayed, whereby the visual effect can be enhanced.

According to a thirteenth aspect of the invention, there is provided an information processing apparatus including an image data storage section for storing image data corresponding to a real image and link data, a road map data storage section for storing road map data, a third image data acquisition section for acquiring the image data corresponding to the real image of a destination based on position data of the destination and the link data, when the destination is set. The link data links the image data and the road map data.

According to the thirteenth aspect, if the destination is set, the image data corresponding to the real image of the destination can be input. Therefore, the real image of the destination set by the user can be put, for example, on the goal point on the guidance route (namely, the destination) on the road map displayed on the display screen and can be contained in history information of the destination.

According to a fourteenth aspect of the invention, The information processing apparatus of the thirteenth aspect, further includes a seventh display control section for displaying the real image corresponding to the image data acquired by the third image data acquisition section at a position corresponding to the destination on a road map.

According to the fourteenth aspect, the real image of the destination can be displayed at the position corresponding to the destination on the road map. Therefore, determination as to whether or not the destination is reached can be made more clearly.

According to a fifteenth aspect of the invention, the information processing apparatus of the thirteenth aspect, further includes a storage section for storing the image data acquired by the third image data acquisition section, a storage control section for making the storage section store the image data acquired by the third image data acquisition section, and an eighth display control section for displaying the real image corresponding to the image data stored by the storage section on a display screen.

According to the fifteenth aspect, the image data acquired by the third image data acquisition section (namely, the image data corresponding to the real image of the destination set by the user) can be stored in the predetermined storage section, so that the real image of the destination can be left as history information of the destination.

Since the real image corresponding to the image data stored in the predetermined storage section (namely, the real image of the destination) can be displayed on the display screen, the place visited in the past can be seen as the real image.

According to a sixteenth aspect of the invention, the information processing apparatus of the thirteenth aspect, further includes a guidance route calculation section for calculating a guidance route to the destination, and a fourth image data acquisition section for acquiring the image data corresponding to the real image of a relay point based on position data of the relay point contained in the guidance route calculated by the guidance route calculation section and the link data.

According to the sixteenth aspect, if the guidance route to the destination is calculated, the image data corresponding to the real image of a relay location contained in the guidance route can be input. Therefore, the real image of the relay location at midpoint to the destination can be put, for example, on the relay point on the guidance route on the road map displayed on the display screen and can be contained in history information of the run route.

According to a seventeenth aspect of the invention, the information processing apparatus of the sixteenth aspect, further includes a ninth display control section for displaying the real image corresponding to the image data acquired by the third image data acquisition section and the real image corresponding to the image data acquired by the fourth image data acquisition section on the display screen.

According to the seventeenth aspect, the real image corresponding to the image data acquired by the third image data acquisition section (namely, the real image of the destination) and the real image corresponding to the image data acquired by the fourth image data acquisition section (namely, the real image of the relay location) can be displayed on the display screen.

Therefore, the user can reference not only the real image of the destination, but also the real image of the relay location (via point) to the destination, so that the user can well keep track of the guidance route to the destination.

BRIEF DESCRIPTION OF THE DRAWINGS

In the accompanying drawings:

FIG. 3 is a drawing to show the storage format in the DVD-ROM installed in the navigation system adopting the information processing apparatus according to the first embodiment of the invention;

FIG. 19 is a drawing to show an operation screen displayed on the display panel of the navigation system adopting the information processing apparatus according to the second embodiment of the invention;

FIG. 20 is a drawing to show an operation screen displayed on the display panel of the navigation system adopting the information processing apparatus according to the second embodiment of the invention;

FIG. 21 is a drawing to show the storage format in a DVD-ROM installed in a navigation system adopting an information processing apparatus according to a third embodiment of the invention;

DETAILED DESCRIPTION OF THE PREFERRED EMBODIMENTS

First Embodiment

Figure 1:
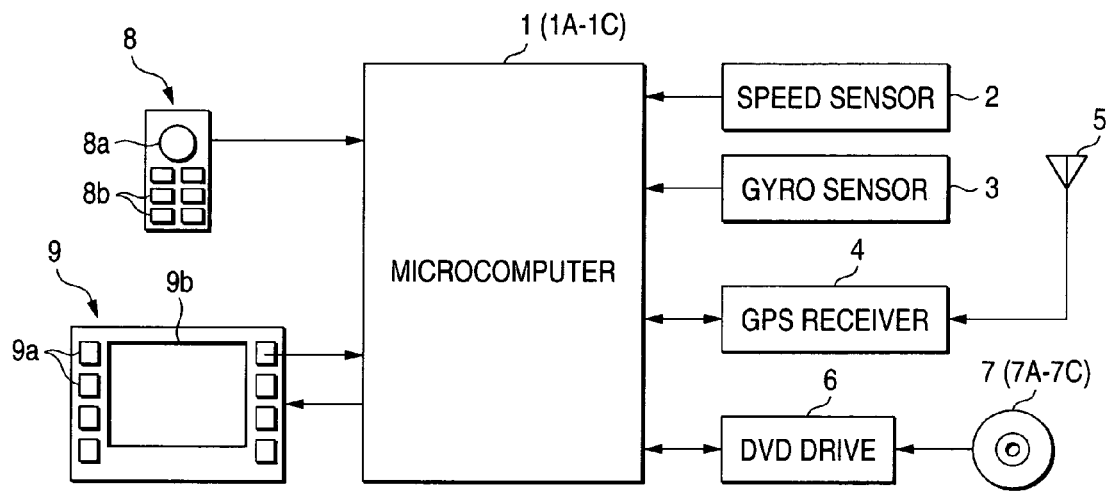
FIG. 1 is a block diagram to schematically show the main part of a navigation system adopting an information processing apparatus according to a first embodiment of the invention.

Referring now to the accompanying drawings, there are shown preferred embodiments of an information processing apparatus according to the invention. FIG. 1 is a block diagram to schematically show the main part of a navigation system adopting an information processing apparatus according to a first embodiment of the invention.

A speed sensor 2 for acquiring data concerning the traveled distance and a gyro sensor 3 for acquiring data concerning the traveling direction are connected to a microcomputer 1. The microcomputer 1 determines the position of the navigation system based on the acquired data (autonomous navigation).

A GPS receiver 4 receives a GPS signal from a satellite through an antenna 5 and is connected to the microcomputer 1 and the microcomputer 1 determines the position of the navigation system based on the GPS signal (GPS navigation).

A DVD-ROM stores road map data, image data, specific data, image display position data, link data, and the like. The image data corresponds to a real image such as a satellite photograph showing the surface of the Earth. The specific data corresponds to specific items such as name and position, which can specify a spot such as a facility. The image display position data indicates a position where the real image of the spot is displayed. The link data links the position of the spot and the road map data. A DVD drive 6 can acquire the road map data and the like from the DVD-ROM 7 (which may be any other storage unit, for example, a CD-ROM or a magnetic disk such as a hard disk). The DVD drive 6 is connected to the microcomputer 1. The microcomputer 1 matches the determined position of the navigation system and the road map data (so-called map matching processing), thereby displaying a map precisely indicating the position of the navigation system on a display panel 9b. The microcomputer 1 can also display a real image on the display panel 9b based on the image data.

Figure 2:
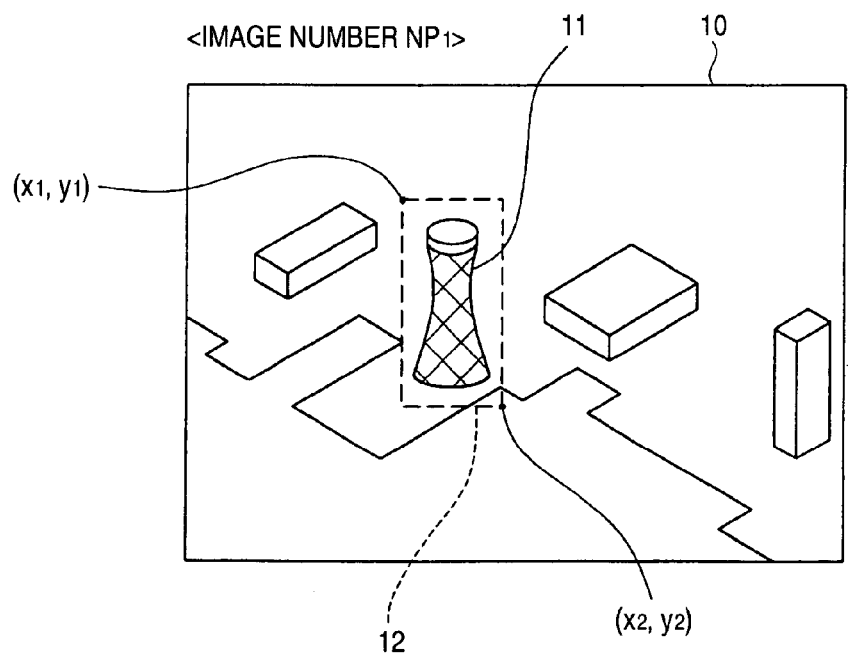
FIG. 2 is a schematic drawing to show an example of a real image corresponding to image data stored in a DVD-ROM installed in the navigation system adopting the information processing apparatus according to the first embodiment of the invention.

FIG. 2 is a schematic drawing to show an example of a real image corresponding to the image data stored in the DVD-ROM 7. An image 11 of "ox tower" is displayed in a real image 10. The real images are given image numbers in a one-to-one correspondence; for example, the real image 10 containing the image 11 of "ox tower" is given image number $NP_1$.

FIG. 3 is a drawing to show the storage format of the specific data, the image display position data, and the link data stored in the DVD-ROM 7. As shown in FIG. 3, the DVD-ROM 7 stores the specific data such as the name data and the location data for each spot to determine the spot, the image display position data indicating the position where the real image of the spot is displayed (for example, upper left coordinate data and lower right coordinate data of the rectangular image frame containing the spot), and the link data to link the spot and the road map data.

For example, as the specific data of spot number $NS_1$, data indicating that the name is "ox tower" and data indicating that the location is "Δ-Δ-Δ, xx-chou, oo-ku, Koube-shi" are stored. As the image display position data, data indicating the image number $NP_1$ of the real image 10, the upper-left corner coordinate data $(x_1, y_1)$, and the lower-right corner coordinate data $(x_2, Y_2)$ of a rectangular frame 12 containing the image 11 (see FIG. 2), and the link data $(X_1, Y_1)$ to link the spot and the road map data are stored.

Here, the link data to link each spot and the road map data is stored. However, in another embodiment, link data to link the place indicated by the real image and the road map data (for example, coordinate data indicating the latitude and longitude of the upper-left corner of the real image) may be stored for each real image.

Switch signals output from a joystick 8a and a button switch 8b disposed on a remote control 8 and a switch signal output from a button switch 9a disposed on the display 9 are input to the microcomputer 1, which then performs processing responsive to the switch signals.

For example, when the microcomputer 1 inputs information of a destination from the switches, the microcomputer 1 searches an optimum route from the position of the navigation system to the destination and displays the optimum route as a guidance route on the display panel 9b together with the road map. The road map data, the image data, the specific data, the image display position data, and the link data stored in the DVD-ROM 7 are stored in a memory (not shown) in the microcomputer 1, if necessary.

Figure 4:
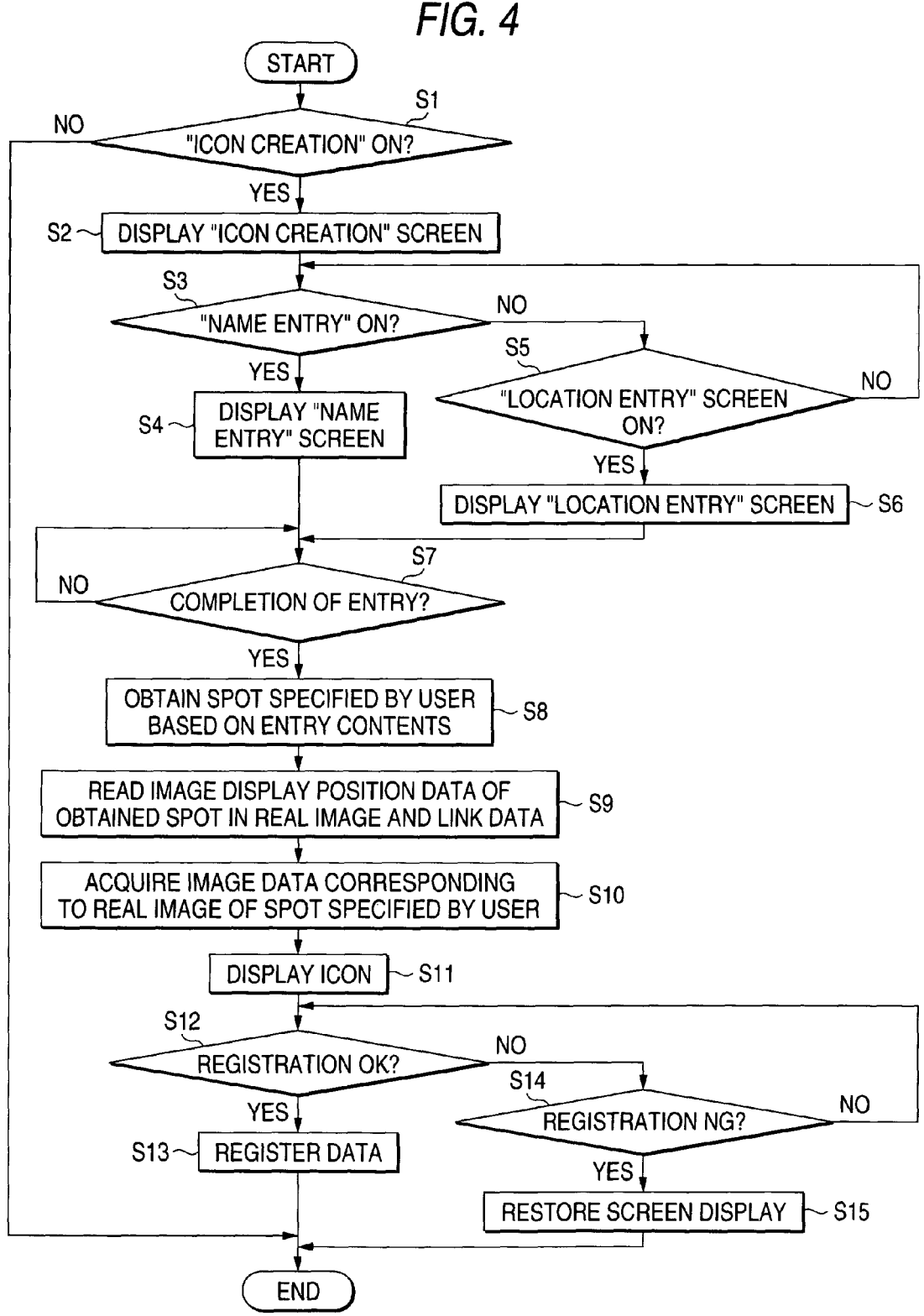
FIG. 4 is a flowchart to show processing operation performed by a microcomputer in the navigation system adopting the information processing apparatus according to the first embodiment of the invention.
Figure 5:
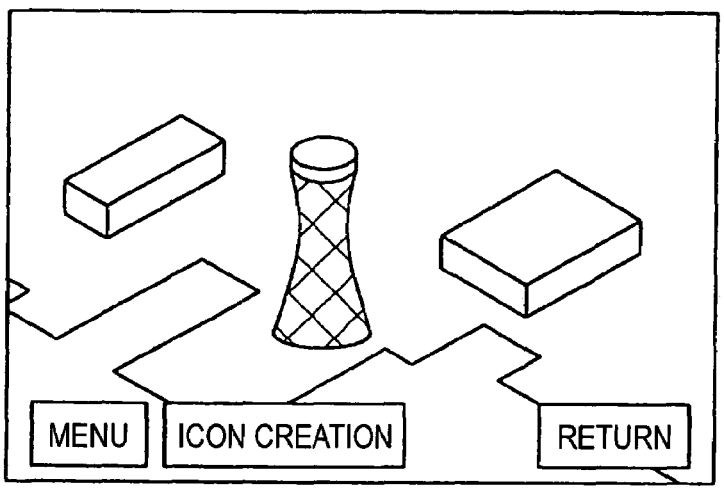
FIG. 5 is a drawing to show an operation screen displayed on a display panel of the navigation system adopting the information processing apparatus according to the first embodiment of the invention.

Next, processing operation (1) performed by the microcomputer 1 in the navigation system adopting the information processing apparatus according to the first embodiment will be discussed based on a flowchart of FIG. 4. The processing operation (1) is a processing operation, which is performed when a real image is displayed on the display panel 9b, for example, as shown in FIG. 5. The navigation system enables the user to switch to an ICON CREATION screen through the screen as shown in FIG. 5.

Figure 6:
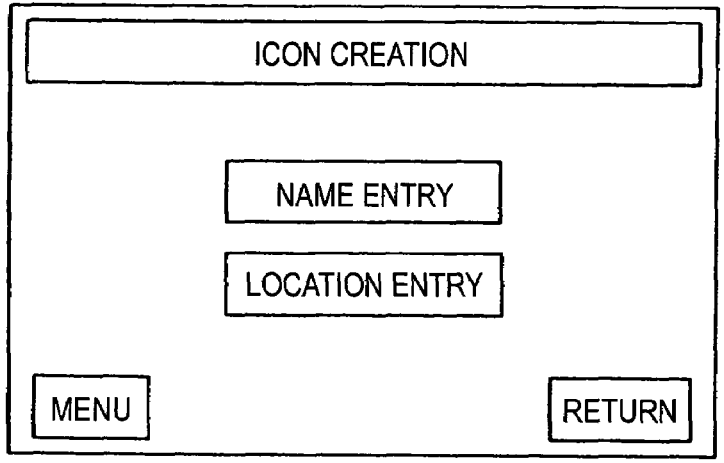
FIG. 6 is a drawing to show an operation screen displayed on the display panel of the navigation system adopting the information processing apparatus according to the first embodiment of the invention.

To begin with, whether or not the user enters a switch command to the ICON CREATION screen to create an icon as cut out from the real image is determined (step S1). If it is determined that the user enters a switch command to the ICON CREATION screen, the ICON CREATION screen as shown in FIG. 6 is displayed on the display 9b (step S2). On the other hand, if it is not determined that the user enters a switch command to the ICON CREATION screen, the processing operation (1) is terminated.

At step S3, whether or not the user selects NAME ENTRY is determined. If it is determined that the user selects NAME ENTRY, a NAME ENTRY screen (not shown) is displayed on the display panel 9b (step S4) and then the processing operation (1) proceeds to step S7. On the other hand, if it is not determined that the user selects NAME ENTRY, whether or not the user selects LOCATION ENTRY is determined (step S5). If it is determined that the user selects LOCATION ENTRY, a LOCATION ENTRY screen (not shown) is displayed on the display panel 9b (step S6) and then the processing operation (1) proceeds to step S7. On the other hand, if it is not determined that the user selects LOCATION ENTRY, the processing operation (1) returns to step S3.

At step S7, whether or not the user completes the name (or location) entry of the spot through the NAME ENTRY screen (or the LOCATION ENTRY screen). If it is not determined that the entry is complete, the processing operation (1) returns to step S7; on the other hand, if it is determined that the entry is complete, the spot specified by the user is obtained based on the entry contents and the specific data (step S8). For example, if the user enters "ox tower" through the NAME ENTRY screen, it can be determined that the spot of spot number $NS_1$ is specified.

The name and the location of each spot can also be entered using the switches disposed on the remote control 8 and the display 9; in another embodiment, a voice input unit, a voice analysis unit, etc., may be installed for enabling the user to enter by voice.

Next, the image display position data of the spot specified by the user (for example, the spot of spot number $NS_1$) in the real image and the link data are read from the memory in the microcomputer 1 (step S9). Then, the image data corresponding to the real image of the spot specified by the user is acquired based on the read-image display position data and the image data (step S10).

For example, if the user specifies the spot of spot number $NS_1$ (namely, the user enters "ox tower" or "Δ-Δ-Δ, xx-chou, oo-ku, Koube-shi"), image data corresponding to the image surrounded by the rectangular frame 12 formed based on the upper-left corner coordinate data $(x_1, y_1)$ and the lower-right corner coordinate data $(x_2, y_2)$ is acquired from the image data of image number $NP_1$.

Figure 7:
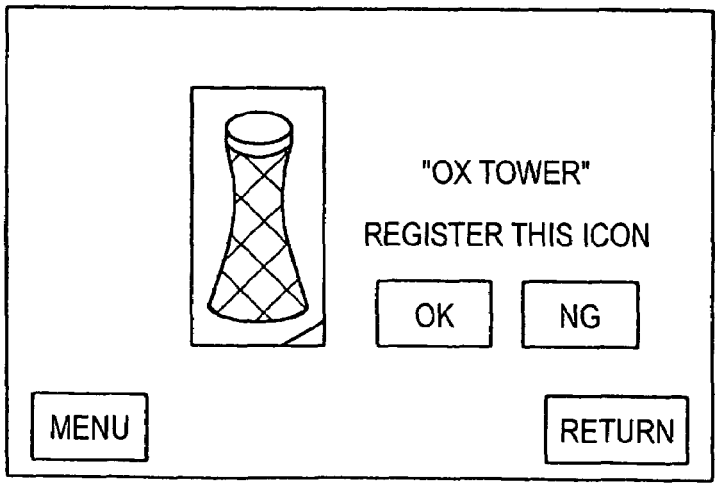
FIG. 7 is a drawing to show an operation screen displayed on the display panel of the navigation system adopting the information processing apparatus according to the first embodiment of the invention.

Next, the real image (icon) corresponding to the acquired image data is displayed on the display panel 9b as shown in FIG. 7 (step S11) and then whether or not the user enters a registration command of the icon is determined (step S12). If it is determined that the user enters a registration command, the image data acquired at step S10 and the link data read at step S9 are related to each other and are registered in a nonvolatile memory (not shown) in the microcomputer 1 (step S13). Accordingly, the data concerning the icon of the spot specified by the user can be registered.

On the other hand, if it is not determined that the user enters a registration command, whether or not the user enters a cancel command of the icon is determined (step S14). If it is determined that the user enters a cancel command, the screen as shown in FIG. 5 is displayed on the display panel 9b (step S15). On the other hand, if it is not determined that the user enters a cancel command, the processing operation (1) returns to step S12.

Figure 8:
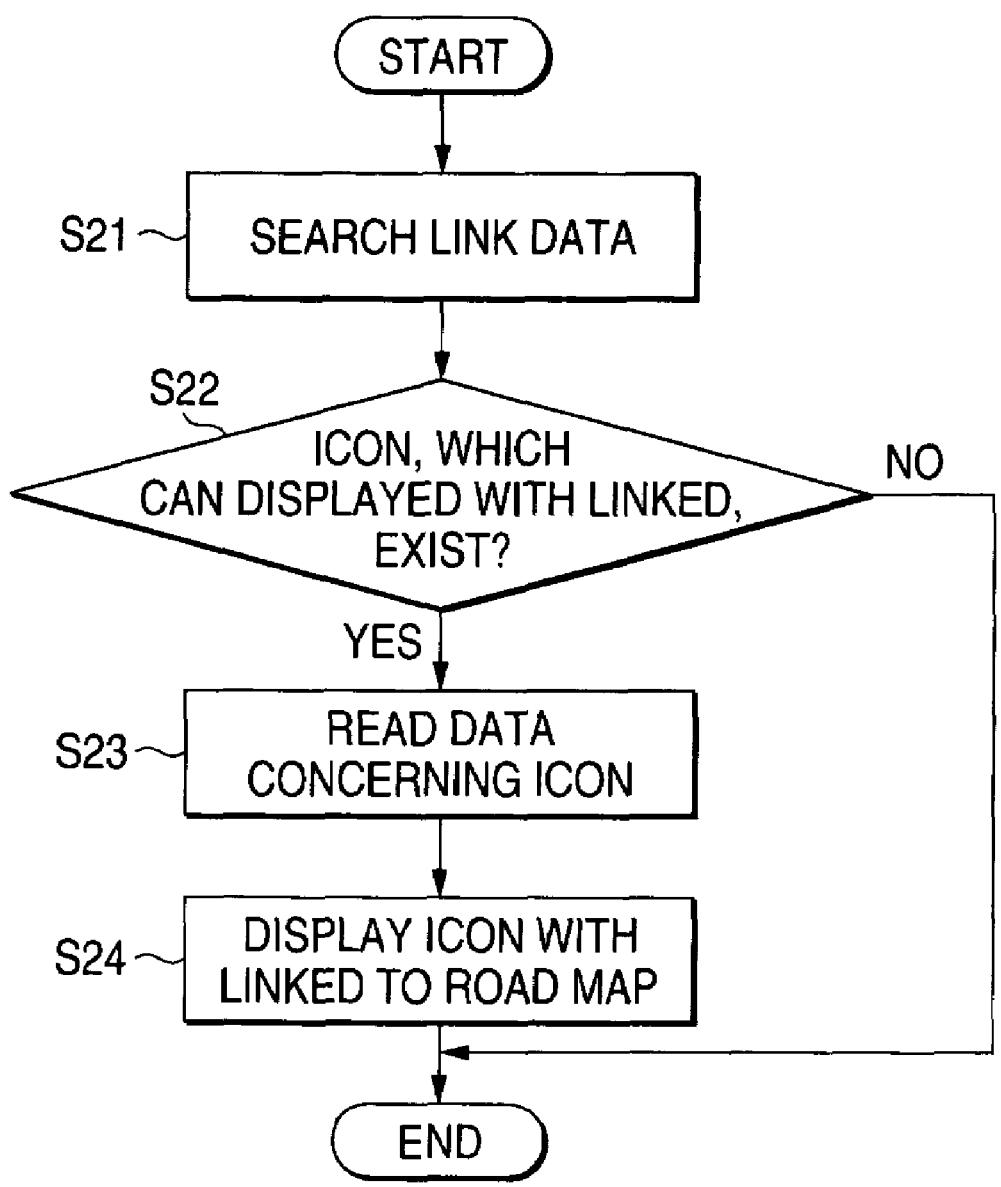
FIG. 8 is a flowchart to show processing operation performed by the microcomputer in the navigation system adopting the information processing apparatus according to the first embodiment of the invention.

Next, a processing operation (2) performed by the microcomputer 1 in the navigation system adopting the information processing apparatus according to the first embodiment will be discussed based on a flowchart of FIG. 8. The processing operation (2) is a processing operation, which is performed when a road map is displayed on the display panel 9b based on the road map data.

To begin with, a search is made with respect to the data concerning the icons registered in the nonvolatile memory (the image data corresponding to the real images of the spots specified by the user and the link data) (step S21). It is determined as to whether or not an icon, which can be displayed with linked to the road map, exists on the road map displayed on the display panel 9b (step S22).

If it is determined that an icon, which can be displayed with linked to the road map, exists, the data concerning the icon (image data and link data) is read (step S23). The real image corresponding to the image data (namely, the icon) is displayed with linked to the road map on the road map based on the read link data (step S24). On the other hand, if it is not determined that an icon exists, which can be displayed with linked to the road map, the processing operation (2) is terminated.

For example, if the information processing apparatus approaches the position where the icon is displayed (namely, the spot specified by the user), the icon displayed on the road map with linked to the road map may be displayed on an enlarged scale or may be blink-displayed, whereby the visual effect can be enhanced.

Figure 9:
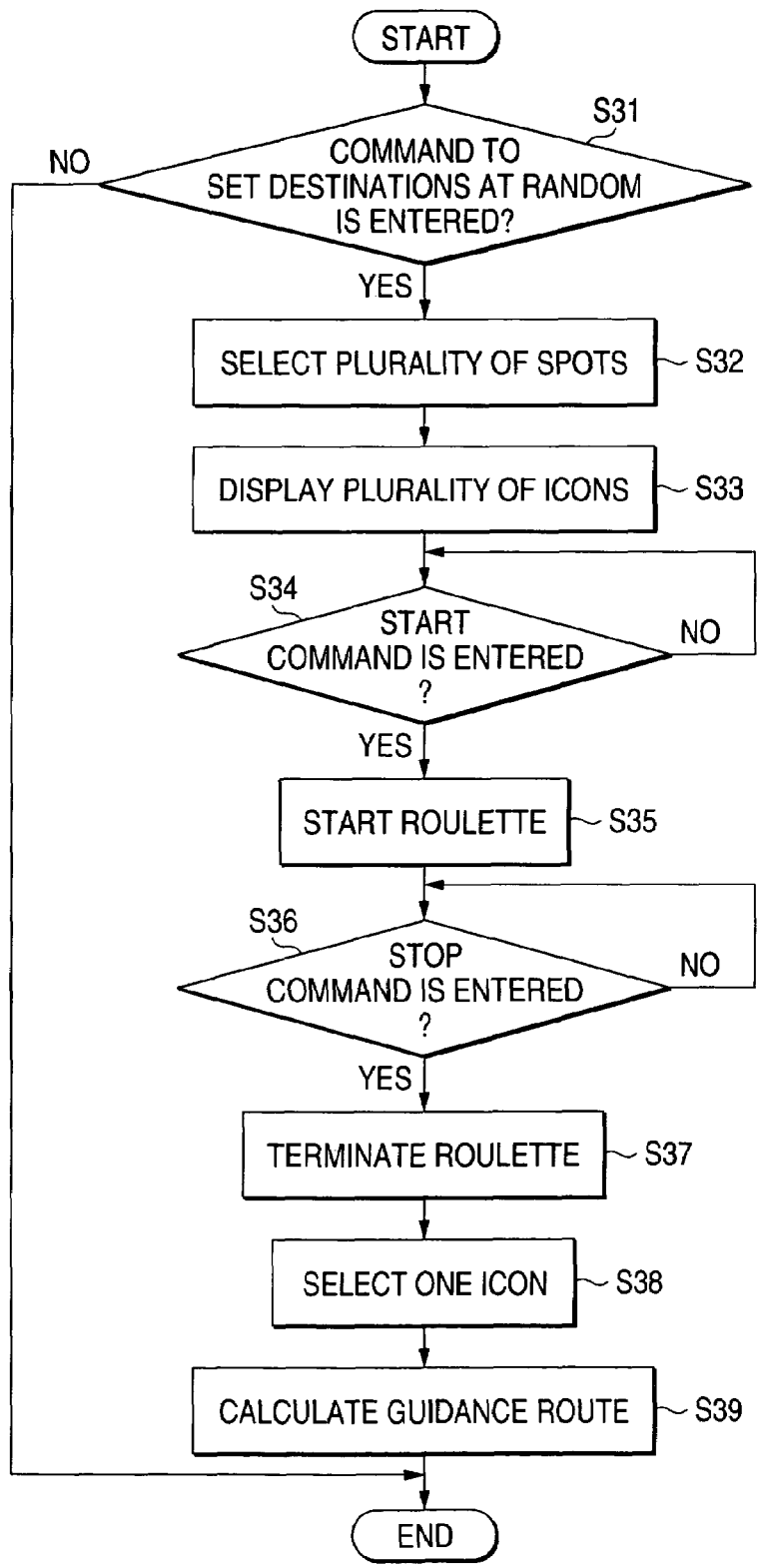
FIG. 9 is a flowchart to show processing operation performed by the microcomputer in the navigation system adopting the information processing apparatus according to the first embodiment of the invention.

Next, a processing operation (3) performed by the microcomputer 1 in the navigation system adopting the information processing apparatus according to the first embodiment will be discussed based on a flowchart of FIG. 9.

Figure 10:
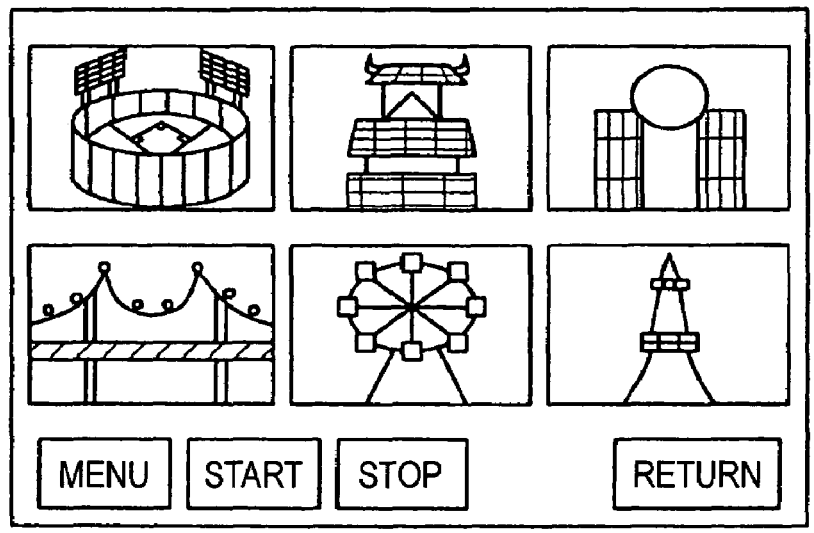
FIG. 10 is a drawing to show an operation screen displayed on the display panel of the navigation system adopting the information processing apparatus according to the first embodiment of the invention.

To begin with, whether or not the user enters a command to set destinations on a random basis is determined (step S31). If it is not determined that the user enters the command, the processing operation (3) is terminated. On the other hand, if it is determined that the user enters the command, two or more (for example, six) destinations are selected from the data concerning the icons registered in the nonvolatile memory (step S32). The icons of the six selected spots are displayed on the display panel 9b as shown in FIG. 10 (step S33).

Next, whether or not the user enters a START command to start roulette is determined (step S34). If it is determined that the user enters a START command, roulette is started (step S35). The roulette mentioned here is used to mean making the icons shine, for example, in order counterclockwise.

Next, whether or not the user enters a STOP command to terminate roulette is determined (step S36). If it is determined that the user enters a STOP command, roulette is terminated (step S37). For example, if the STOP command is entered, the rotation speed is slowed gradually and the roulette is terminated.

Figure 11:
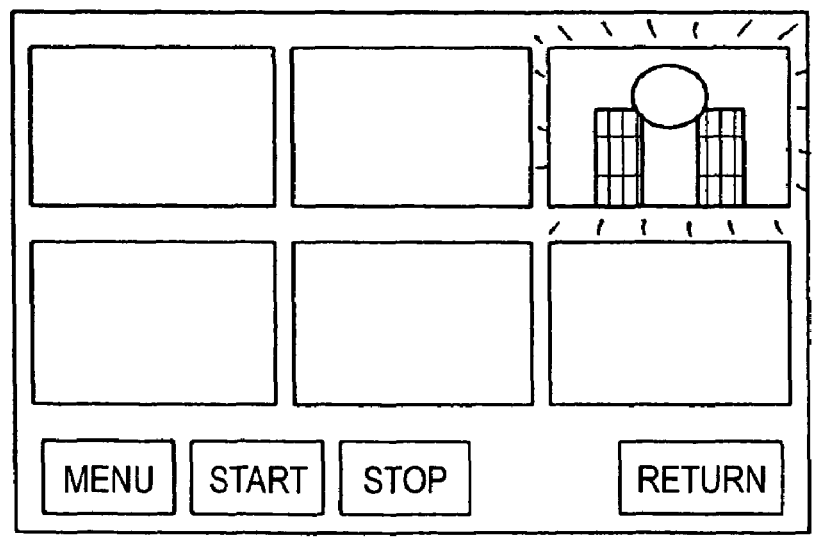
FIG. 11 is a drawing to show an operation screen displayed on the display panel of the navigation system adopting the information processing apparatus according to the first embodiment of the invention.

Only the icon, which is made to shine when the roulette is terminated, is left and the other five icons are erased from the screen as shown in FIG. 11 (step S38). Then, a guidance route to the spot indicated by the left spot is calculated (step S39).

According to the navigation system adopting the information processing apparatus according to the first embodiment, if the selection range (for example, the rectangular frame 12 containing the spot specified by the user) is specified with respect to the real image displayed on the display panel 9b, the image data corresponding to the real image in the specified selection range can be acquired. Since the selection range is specified based on the specific item entered by the user, the image data corresponding to the real image specified by the user (namely, the image desired by the user) can be input.

The acquired real image (icon) can be linked to the road map displayed on the display panel 9b based on the link data and be display. That is, the acquired real image (icon) can be displayed at the place of the spot on the roadmap. Therefore, the user need not perform operation of finding the place of the spot and putting the icon thereon so that the system very excellent in operability can be provided. Since the registered icons can be used to determine a destination in a similar way to playing a game, a drive can be made more enjoyable.

In the navigation system adopting the information processing apparatus according to the first embodiment, the real image of the spot specified by the user (icon) is displayed at the place of the spot on the road map. However, in a navigation system adopting an information processing apparatus according to another embodiment, the icon (namely, the image to the user's taste) may be put on any desired place such as the goal of the guidance route or the user's home.

In the navigation system adopting the information processing apparatus according to the first embodiment, only one real image is provided for the same place. However, in a navigation system adopting an information processing apparatus according to another embodiment, real images responsive to various circumstances (for example, seasons) may be prepared for the same place. When the image data corresponding to the real image of the spot specified by the user is registered, image data corresponding to two or more real images responsive to various circumstances and circumstance data corresponding to the image data may be registered in combination.

Accordingly, it is made possible to display a real image responsive to the season, etc. For example, to display a specific mountain specified by the user, if the current season is the spring, the mountain where cherry blossoms are blooming can be displayed; if the season is the winter, the mountain where snow is fallen can be displayed, so that emotional images can be displayed.

In the navigation system adopting the information processing apparatus according to the first embodiment, description has been described with regard to only the case where the user enters the name or the location of each spot is described as the icon creation processing. A navigation system for performing different icon creation processing will be discussed as a navigation system adopting an information processing apparatus according to a second or third embodiment.

Second Embodiment

To begin with, the navigation system adopting the information processing apparatus according to the second embodiment will be discussed. The configuration of this navigation system is similar to that of the navigation system previously described with reference to FIG. 1 except for microcomputer 1 or DVD-ROM 7. Therefore, microcomputer and DVD-ROM are denoted by reference numerals different from those in FIG. 1 and other components will not be discussed again.

A DVD-ROM 7A stores road map data, image data, like data, and the like. The image data corresponds to a real image such as a satellite photograph showing the surface of the Earth. The link data links a place indicating the real image and the road map data (for example, coordinate data indicating the latitude and longitude of the upper-left corner of the real image).

Figure 12:
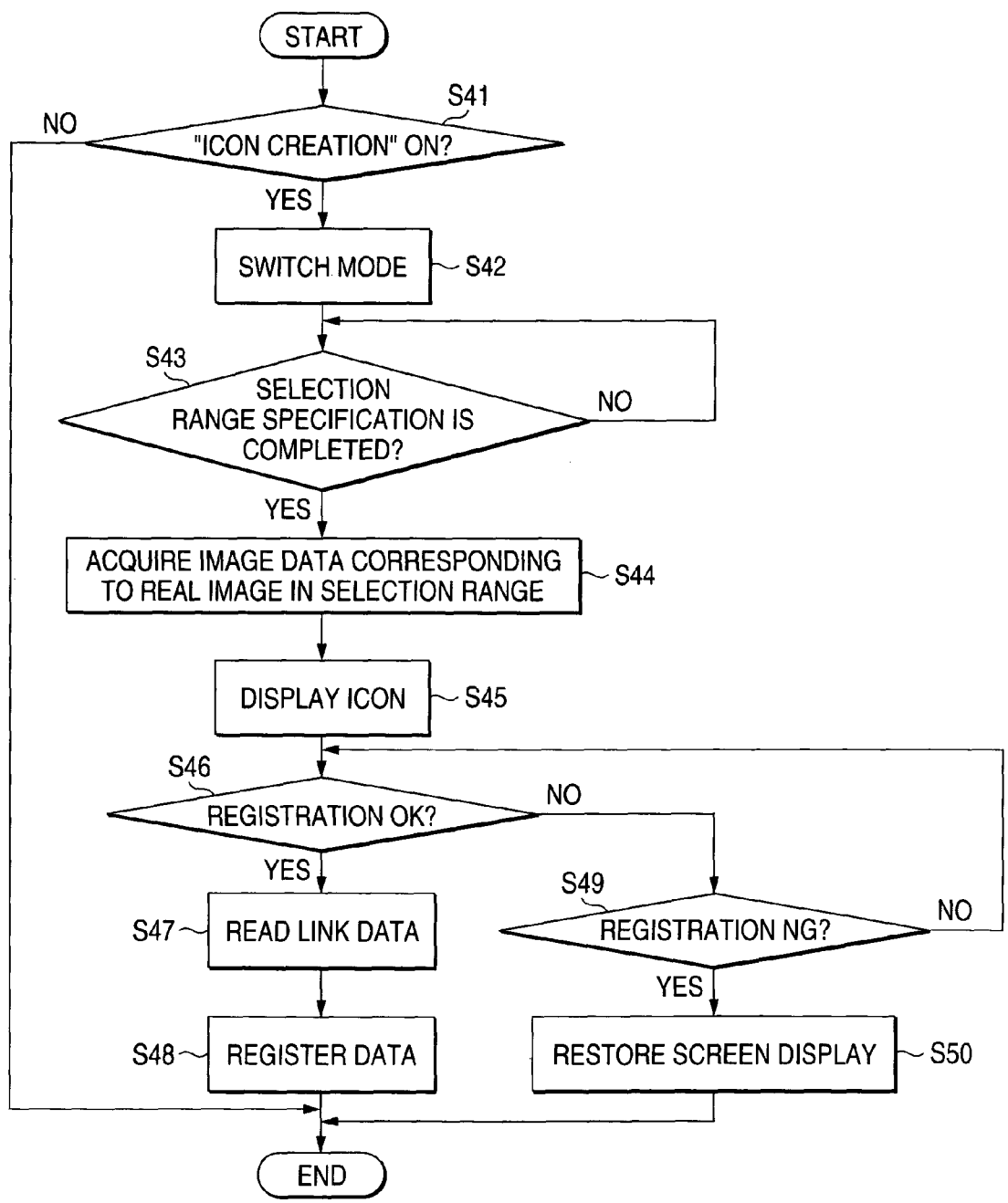
FIG. 12 is a flowchart to show processing operation performed by a microcomputer in a navigation system adopting an information processing apparatus according to a second embodiment of the invention.
Figure 13:
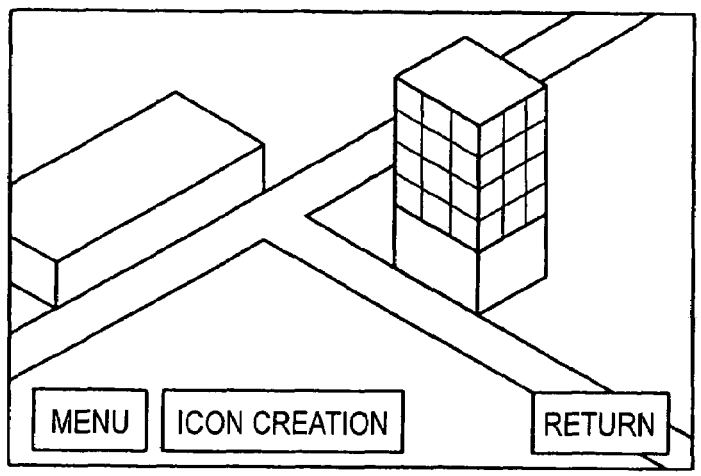
FIG. 13 is a drawing to show an operation screen displayed on a display panel of the navigation system adopting the information processing apparatus according to the second embodiment of the invention.

Next, a processing operation (4) performed by a microcomputer 1A in the navigation system adopting the information processing apparatus according to the second embodiment will be discussed based on a flowchart of FIG. 12. The processing operation (4) is processing operation performed when a real image is displayed on a display panel 9b, for example, as shown in FIG. 13.

To begin with, whether or not the user enters a mode switch command to an ICON CREATION mode for creating an icon as cut out from the real image is determined (step S41). If it is determined that the user enters the mode switch command to the ICON CREATION mode, mode switching is performed (step S42). On the other hand, if it is not determined that the user enters the mode switch command, the processing operation (4) is terminated.

Figure 14:
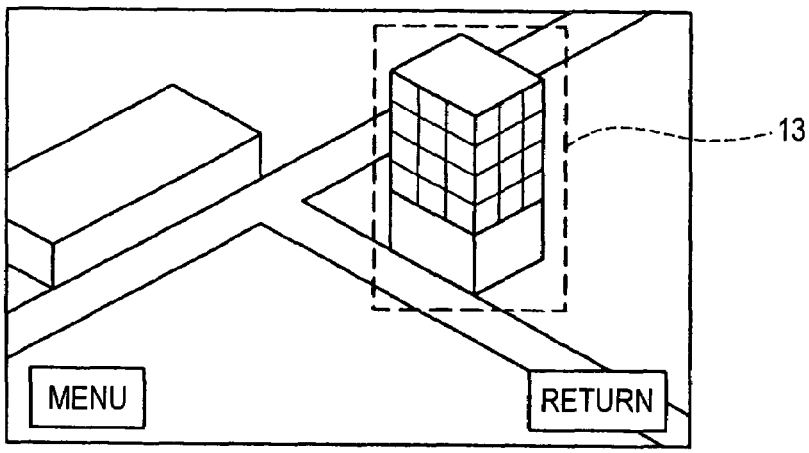
FIG. 14 is a drawing to show an operation screen displayed on the display panel of the navigation system adopting the information processing apparatus according to the second embodiment of the invention.

Next, whether or not the user operates a joystick 8a, etc., of a remote control 8 to specify a selection range (an area surrounded by a rectangular frame 13 formed by the dashed line) with respect to the real image displayed on the display panel 9b as shown in FIG. 14 is determined (step S43). If it is determined that the selection range is specified, the image data corresponding to the real image in the selection range is acquired (step S44). On the other hand, if it is not determined that the selection range is specified, the processing operation (4) returns to step S43.

Figure 15:
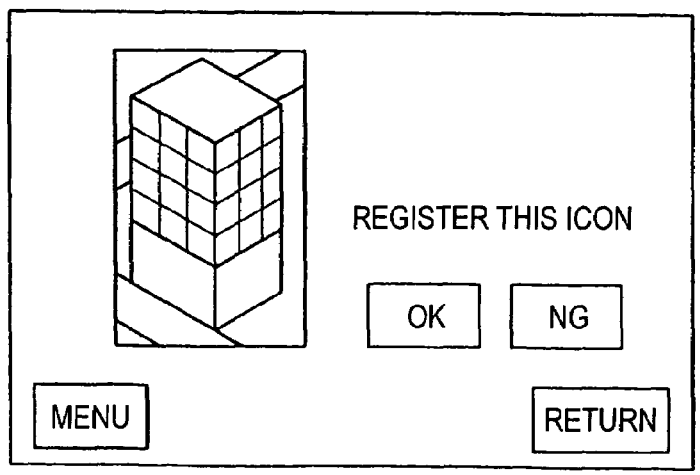
FIG. 15 is a drawing to show an operation screen displayed on the display panel of the navigation system adopting the information processing apparatus according to the second embodiment of the invention.

Next, the real image corresponding to the acquired image data (icon) is displayed on the display panel 9b as shown in FIG. 15 (step S45). Then, whether or not the user enters a registration command of the icon is determined (step S46). If it is determined that the user enters the registration command, the link data of the real image displayed on the display panel 9b is read (step S47). The image data acquired at step S44, coordinate data indicating the display position of the image corresponding to the image data (namely, the frame 13) (upper left coordinate data and lower right coordinate data of the frame 13), and the link data read at step S47 are related to each other and are registered in a nonvolatile memory (not shown) in the microcomputer 1A (step S48). Accordingly, the data concerning the icon of the spot specified by the user can be registered.

On the other hand, if it is not determined that the user enters the registration command, whether or not the user enters a cancel command of the icon is determined (step S49). If it is determined that the user enters the cancel command, the screen as shown in FIG. 13 is displayed on the display panel 9b (step S50). On the other hand, if it is not determined that the user enters the cancel command, the processing operation (4) returns to step S46.

Figure 16:
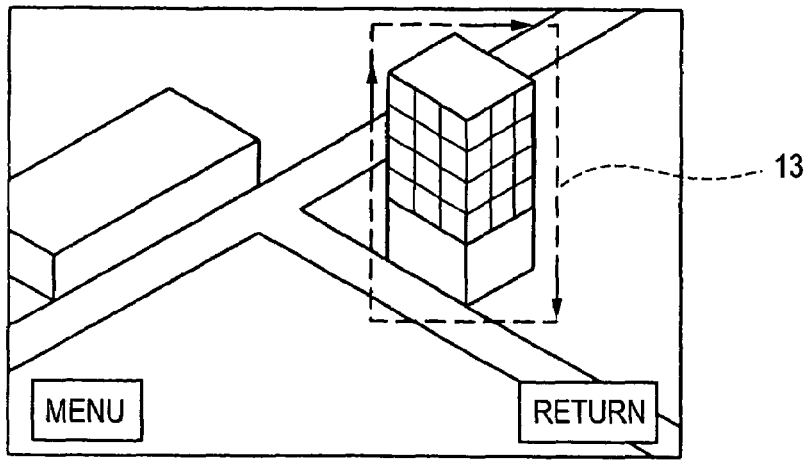
FIG. 16 is a drawing to show an operation screen displayed on the display panel of the navigation system adopting the information processing apparatus according to the second embodiment of the invention.
Figure 17:
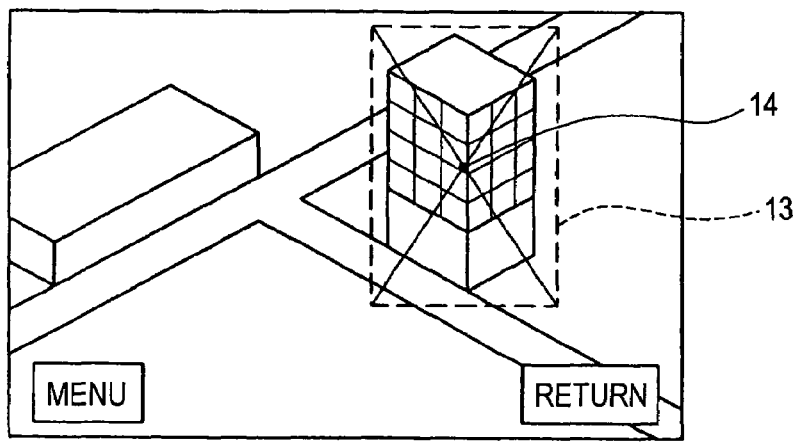
FIG. 17 is a drawing to show an operation screen displayed on the display panel of the navigation system adopting the information processing apparatus according to the second embodiment of the invention.
Figure 18:
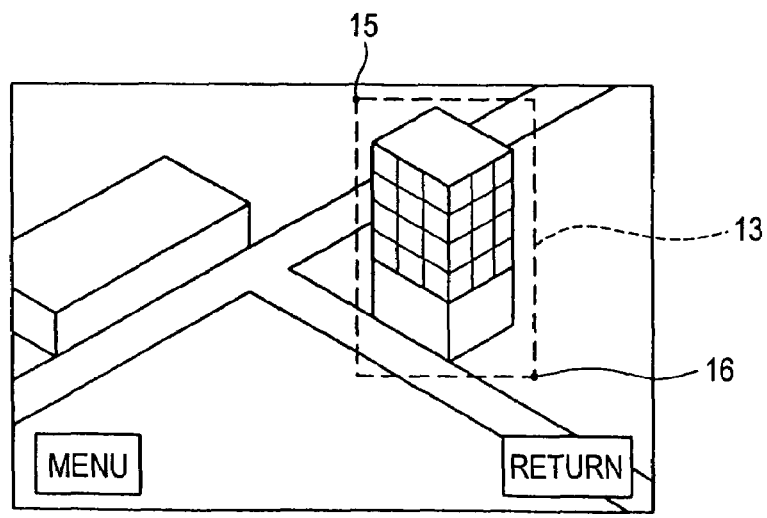
FIG. 18 is a drawing to show an operation screen displayed on the display panel of the navigation system adopting the information processing apparatus according to the second embodiment of the invention.

As the selection range specification method using the joystick 8a, etc., of the remote control 8, for example, the following methods a) to e) are named:

a) Using the joystick 8a, the area surrounded by using pointer displayed on the display panel 9b is specified as the selection range 13, as shown in FIG. 16.

b) An area in a frame formed based on a predetermined condition with one point as a reference point is specified as the selection range 13. As the frame, a preset rectangular (circular, elliptical, etc.,) frame with a reference point 14 as a center or the like is named, for example, as shown in FIG. 17.

c) An area in a frame formed based on a predetermined condition with two points as reference points is specified as the selection range 13. For example, a frame is formed by determining two points of a reference point (upper-left corner) 15 and a reference point (lower-right corner) 16 or as shown in FIG. 18.

d) A frame 17 indicating a predetermined area, which can be moved, is displayed on the display panel 9b and the area indicated by the frame 17 after being moved is specified as the selection range 13, as shown in FIG. 19.

e) A real image displayed on the display panel 9b is divided into a plurality of areas and the area selected by the user among the areas is specified as the selection range 13, as shown in FIG. 20.

According to the navigation system adopting the information processing apparatus according to the second embodiment, when the selection range is specified with respect to the real image displayed on the display panel 9b, the image data corresponding to the real image in the specified selection range can be acquired.

Third Embodiment

Next, the navigation system adopting the information processing apparatus according to the third embodiment will be discussed. The configuration of this navigation system is similar to that of the navigation system previously described with reference to FIG. 1 except for microcomputer 1 or DVD-ROM 7. Therefore, microcomputer and DVD-ROM are denoted by reference numerals different from those in FIG. 1 and other components will not be discussed again.

A DVD-ROM 7B stores road map data, image data, image display position data, link data, and the like. The image data corresponds to a real image such as a satellite photograph of the surface of the Earth. The image display position data indicates a position where the real image of each spot is displayed.

FIG. 21 is a drawing to show a storage format of the image display position data and the link data stored in the DVD-ROM 7B. As shown in FIG. 21, the DVD-ROM 7B stores, for each spot, the image display position data indicating the position where the real image of the spot is displayed, and the link data to link the spot and the road map data.

For example, as the image display position data of spot number $NS_1$, data indicating the image number $NP_1$ of the real image 10 (see FIG. 2), the upper-left corner coordinate data $(x_1, y_1)$ and the lower-right corner coordinate data $(x_2, y_2)$ of a rectangular frame 12 containing the image 11 (see FIG. 2), and the link data $(X_1, Y_1)$ to link the spot and the road map data are stored.

Here, the link data to link each spot to the road map data is stored. However, in another embodiment, for each real image, link data for linking a place indicated by the real image and the road map data (for example, coordinate data indicating the latitude and longitude of the upper-left corner of the real image) may be stored.

Figure 22:
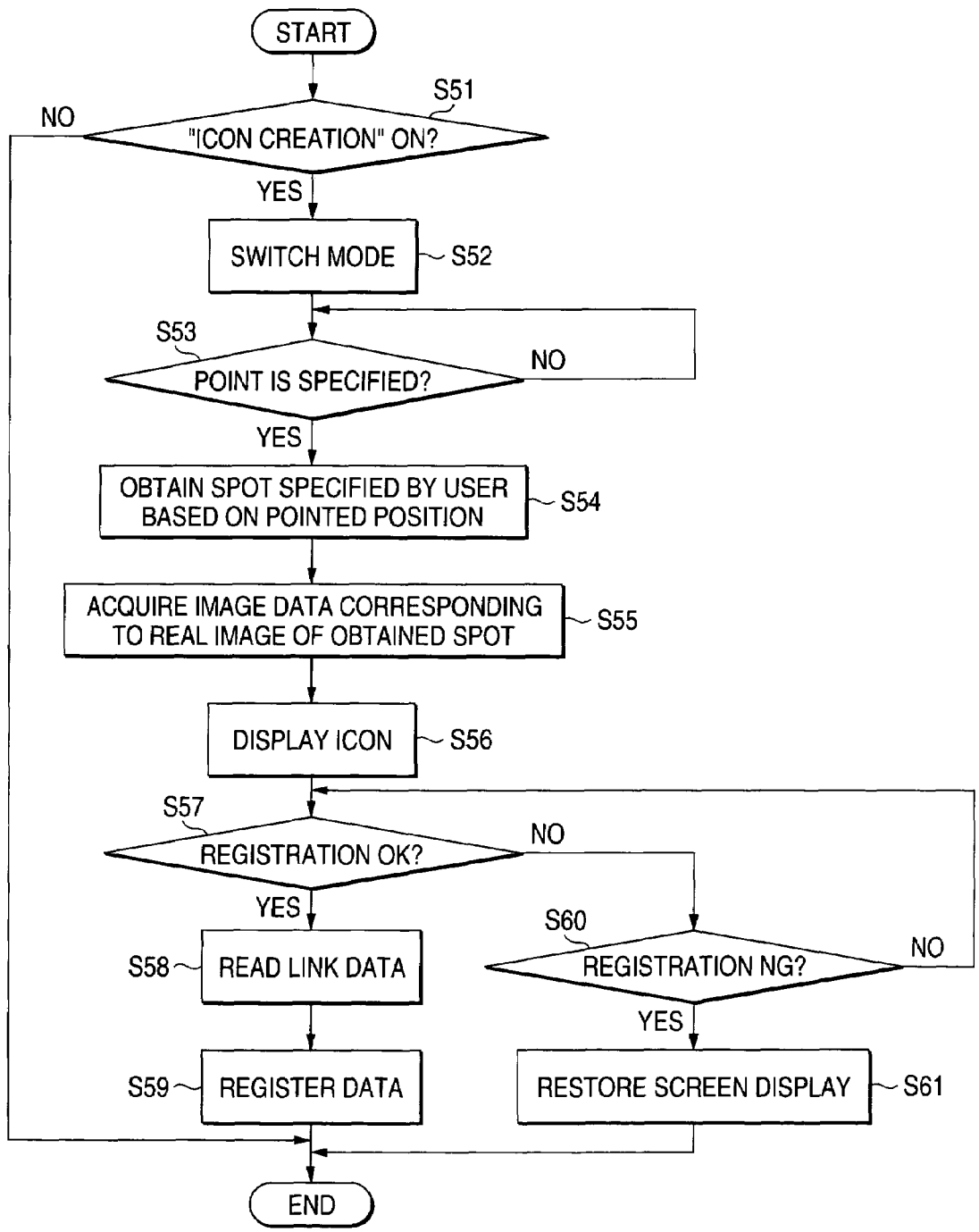
FIG. 22 is a flowchart to show processing operation performed by a microcomputer in the navigation system adopting the information processing apparatus according to the third embodiment of the invention.
Figure 23:
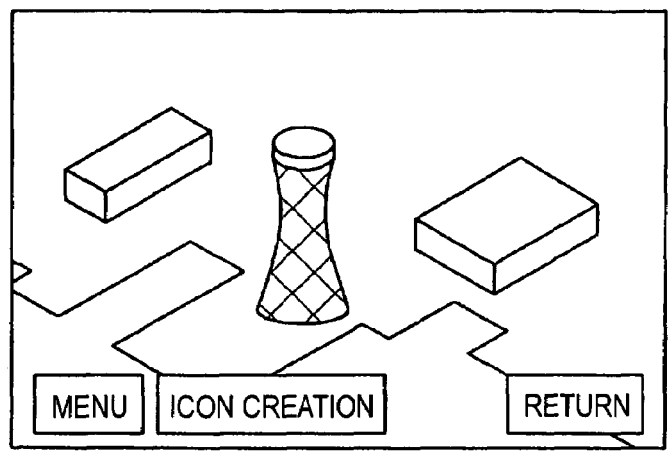
FIG. 23 is a drawing to show an operation screen displayed on a display panel of the navigation system adopting the information processing apparatus according to the third embodiment of the invention.

Next, a processing operation (5) performed by a microcomputer 1B in the navigation system adopting the information processing apparatus according to the third embodiment will be discussed based on a flowchart of FIG. 22. The processing operation (5) is a processing operation, which is performed when a real image is displayed on a display panel 9b, for example, as shown in FIG. 23.

To begin with, whether or not the user enters a mode switch command to an ICON CREATION mode to create an icon as cut out from the real image is determined (step S51). If it is determined that the user enters a mode switch command to the ICON CREATION mode, mode switching is performed (step S52). On the other hand, if it is not determined that the user enters the mode switch command, the processing operation (5) is terminated.

Figure 24:
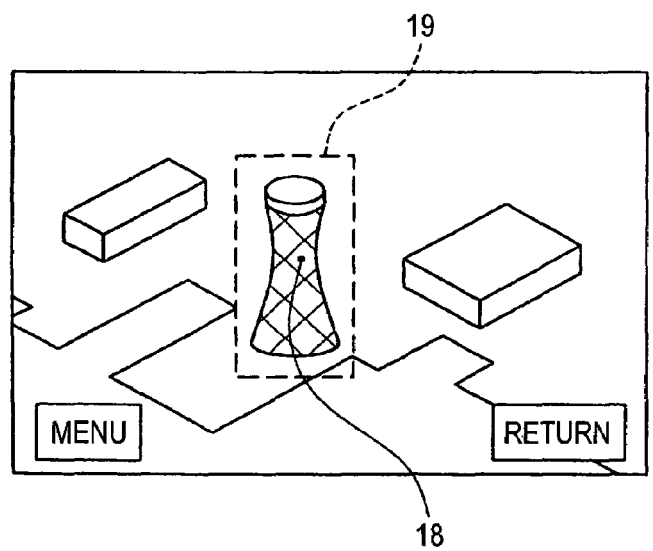
FIG. 24 is a drawing to show an operation screen displayed on the display panel of the navigation system adopting the information processing apparatus according to the third embodiment of the invention.

Next, whether or not the user operates a joystick 8a, etc., of a remote control 8 to specify a point 18 with respect to the real image displayed on the display panel 9b as shown in FIG. 24 is determined (step S53). If it is determined that the point 18 is specified, the spot specified by the user is obtained based on the pointed coordinate position data (step S54). On the other hand, if it is not determined that the point 18 is specified, the processing operation (5) returns to step S53. For example, if the position specified by the user exists in the area of a rectangular frame 19 with upper-left corner coordinates $(x_1, y_1)$ and lower-right corner coordinates $(x_2, y_2)$, it can be determined that the user specifies the spot of spot number $NS_1$.

Figure 25:
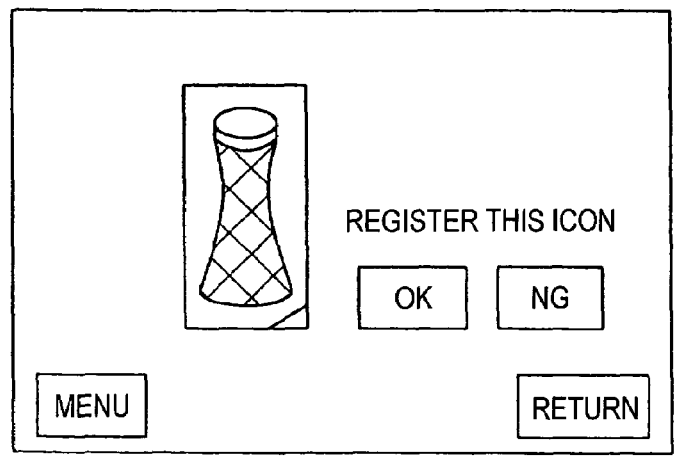
FIG. 25 is a drawing to show an operation screen displayed on the display panel of the navigation system adopting the information processing apparatus according to the third embodiment of the invention.

Next, the image data corresponding to the real image of the obtained spot is acquired (step S55). The real image corresponding to the input image data (icon) is displayed on the display panel 9b as shown in FIG. 25 (step S56). Then, whether or not the user enters a registration command of the icon is determined (step S57). If it is determined that the user enters a registration command, the link data of the real image displayed on the display panel 9b is read (step S58). The image data input at step S55, coordinate data indicating the display position of the image corresponding to the image data (namely, the frame 19) (upper left coordinate data and lower right coordinate data of the frame 19), and the link data read at step S58 are related to each other and are registered in nonvolatile memory (not shown) in the microcomputer 1B (step S59). Accordingly, the data concerning the icon of the spot specified by the user can be registered.

On the other hand, if it is not determined that the user enters the registration command, whether or not the user enters a cancel command of the icon is determined (step S60). If it is determined that the user enters a cancel command, the screen as shown in FIG. 23 is displayed on the display panel 9b (step S61). On the other hand, if it is not determined that the user enters a cancel command, the processing operation (5) returns to step S57.

According to the navigation system adopting the information processing apparatus according to the third embodiment, when the user specifies the point 18 (namely, if the user specifies a desired spot), the image data corresponding to the real image of the specified spot (namely, the image desired by the user) can be acquired.

With the navigation system adopting the information processing apparatus according to any one of the second and third embodiments, the joystick 8a is used to specify the selection range or the spot. However, with a navigation system adopting an information processing apparatus according to another embodiment, any pointing device other than the joystick 8a such as a mouse, a trackball, a light pen, a joystick, and a touch screen may be used to specify the selection range.

Fourth Embodiment

A navigation system adopting an information processing apparatus according to a fourth embodiment will be discussed. The configuration of this navigation system is similar to that of the navigation system previously described with reference to FIG. 1 except for microcomputer 1 or DVD-ROM 7 and therefore microcomputer and DVD-ROM are denoted by reference numerals different from those in FIG. 1 and other components will not be discussed again.

A DVD-ROM 7C stores road map data, image data, link data, and the like. The image data corresponds to a real image such as a satellite photograph showing the surface of the Earth. The link data links a place indicating the real image and the road map data (for example, coordinate data indicating the latitude and longitude of the upper-left corner of the real image). The image data is linked to the road map data.

Figure 26:
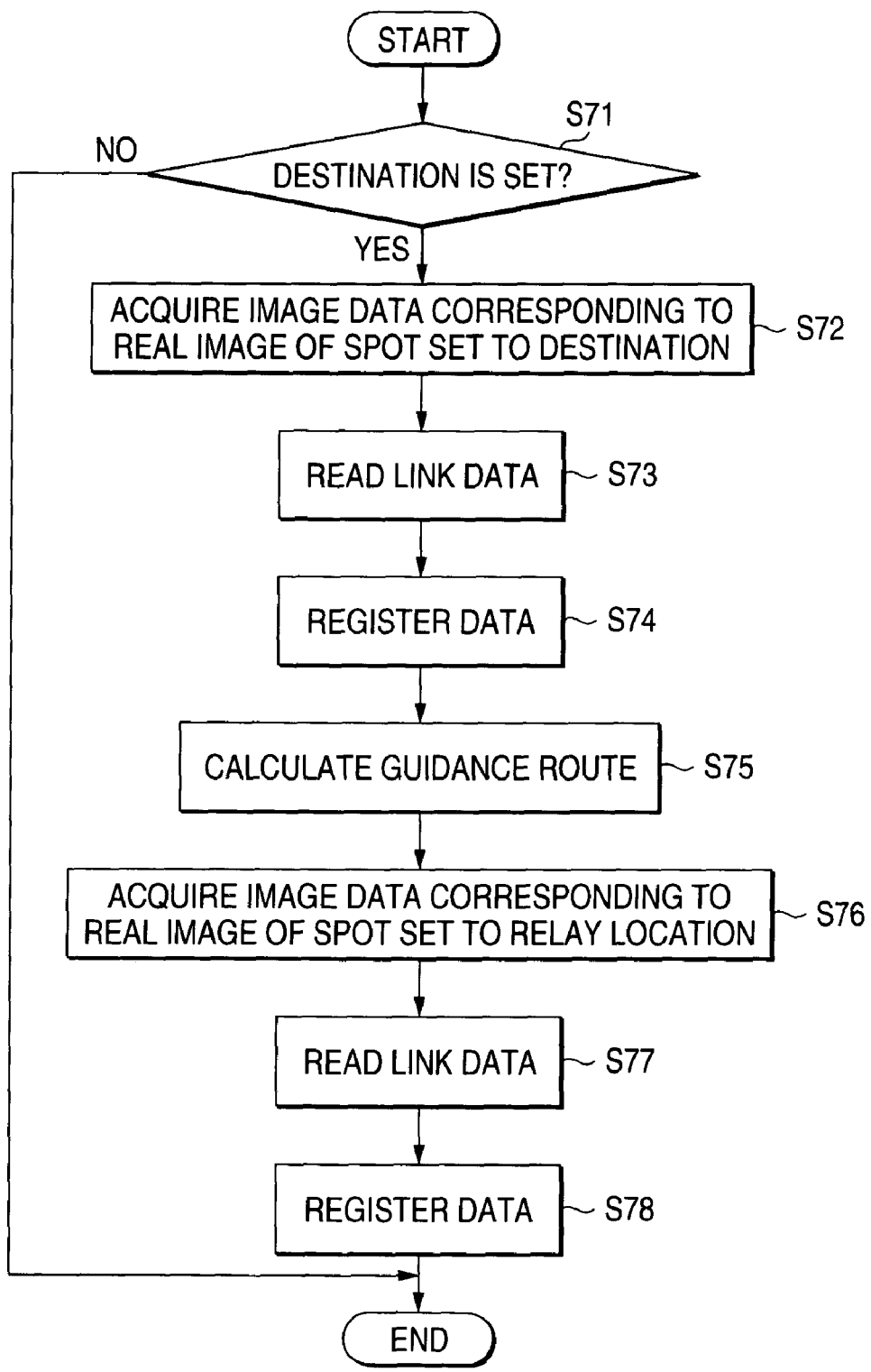
FIG. 26 is a flowchart to show processing operation performed by a microcomputer in a navigation system adopting an information processing apparatus according to a fourth embodiment of the invention.

Next, processing operation (6) performed by a microcomputer 1C in the navigation system adopting the information processing apparatus according to the fourth embodiment will be discussed based on a flowchart of FIG. 26.

To begin with, whether or not the user sets a destination is determined (step S71). If it is determined that the user sets a destination, the image data corresponding to the real image of the spot set to the destination is acquired (S72). On the other hand, if it is not determined that the user sets a destination, the processing operation (6) is terminated. The image data can be acquired appropriately based on the position data of the destination and the link data.

Next, the link data of the real image is read (step S73) The image data acquired at step S72 and the link data read at step S73 are related to each other and are registered in a nonvolatile memory (not shown) in the microcomputer 1C (step S74).

Next, the guidance route to the destination is calculated (step S75). The image data corresponding to the real image of the spot set to a relay location contained in the guidance route is acquired (step S76). The link data of the real image is read (step S77). The image data acquired at step S76 and the link data read at step S77 are related to each other and are registered in the nonvolatile memory (not shown) in the microcomputer 1C (step S78). The image data can also be acquired appropriately based on the position data of the relay location and the link data.

According to the navigation system adopting the information processing apparatus according to the fourth embodiment, when the destination is set, the image data corresponding to the real image of the destination can be acquired. Therefore, the real image of the destination set by the user can be put, for example, on the goal point on the guidance route (namely, the destination) on the road map displayed on the display screen and can be contained in history information of the destination.

When the guidance route to the destination is calculated, the image data corresponding to the real image of a relay location contained in the guidance route can be acquired. Therefore, the real image of the relay location at midpoint to the destination can be put, for example, on the relay point on the guidance route on the road map displayed on the display screen and can be contained in history information of the run route.

What is claimed is:

1. An information processing apparatus comprising:
an image data storage section for storing image data of a photographic image;
a display unit having a display screen;
a display control section for controlling the display unit to display the photographic image on the display screen based on the image data;
a selection range specification section for specifying a selection range with respect to the photographic image displayed on the display screen;
an image data acquisition section for acquiring the image data of the photographic image in the specified selection range to create a photographic icon corresponding to the photographic image as a spot location;
a specific data storage section for storing specific data corresponding to a specific item, which indicates a spot;
an input section allowing a user to input the specific item;
a spot calculation section for obtaining the spot corresponding to the specific item inputted by the user via the input section;
an image display position data storage section for storing image display position data indicating a position where a photographic image of spots are to be displayed;
an image display position calculation section for obtaining the position where the photographic image of the spot obtained by the spot calculation section is to be displayed, based on the image display position data stored by the image display position data storage section; and
a road map data storage section for storing road map data, wherein:
the display control section controls the display unit to display a registration screen for determining whether the photographic icon is registered or not;
the selection range specific section specifies the selection range based on the position obtained by the image display position calculation section to contain the photographic image of the spot obtained by the spot calculation section;
the image data storage section further stores link data so that the image data is linked to the road map data stored by the road map data storage section; and
the image data acquisition section acquires the link data when the image data acquisition section acquires the image data,
wherein the display control section controls the display unit to display a road map on the display screen based on the road map data, and
wherein the display control section controls the display unit to display on the road map, as the spot location, the photographic image of the image data acquired by the image data acquisition section based on the link data.

2. The information processing apparatus according to claim 1, further comprising:
a spot information registration control section for registering information of a spot, which user desires to register,
wherein the image data acquired by the image data acquisition section is contained in data registered as the information of the spot.

3. The information processing apparatus according to claim 2, further comprising:
a spot information presentation section for presenting the information of the spot to the user based on the registered data,
wherein the spot information presentation section displays the photographic image of the image data.

4. The information processing apparatus according to claim 2, further comprising:
a spot selection section for selecting a plurality of spots based on a predetermined condition from spots registered as the spot information; and
a spot information presentation section for presenting the information of the plurality of spots selected by the spot selection section to the user,
wherein the spot information presentation section displays the photographic image of the image data.

5. The information processing apparatus according to claim 1,
wherein the image data storage section stores:
the image data of the photographic images of each spot in response to various conditions; and
condition data indicating the various conditions related to the image data;
wherein the image data acquisition section acquires:
a plurality of image data of the photographic images of each spot in response to the various conditions; and
the condition data; and
wherein the display control section controls the display unit to display the photographic image of the image data acquired by the image data acquisition section on the display screen based on a condition at a predetermined time and the condition data.

6. The information processing apparatus according to claim 1,
wherein the display control section controls the display unit to display road a map and a position of the information processing apparatus on the display screen based on the road map data;

wherein the display control section controls the display unit to display the photographic data of the image data acquired by the image data acquisition section at a predetermined position on the road map; and wherein the display control section changes a display mode of the photographic image based on a correlation between the position of the information processing apparatus on the road map and the predetermined position.

7. An information processing apparatus comprising:

an image data storage section for storing image data of a photographic image;

a display unit having a display screen;

a display control section for controlling the display unit to display the photographic image on the display screen based on the image data;

a selection range specification section for specifying a selection range with respect to the photographic image displayed on the display screen;

an image data acquisition section for acquiring image data of the photographic image in the specified selection range to create a photographic icon corresponding to the photographic image as a spot location;

a pointing device for allowing a user to input coordinate position data; and a road map data storage section for storing road map data, wherein:

the display control section controls the display unit to display a registration screen for determining whether the photographic icon is registered or not;

the selection range specification section specifies the selection range based on the coordinate position data;

the image data storage section further stores link data so that the image data is linked to the road map data stored by the road map data storage section; and the image data acquisition section acquires the link data when the image data acquisition section acquires the image data, wherein the display unit displays a road map and a position of the information processing apparatus on the display screen based on the road map data;

wherein the display control section controls the display unit to display, as the spot location, the photographic data of the image data acquired by the image data acquisition section at a predetermined position on the road map.

8. The information processing apparatus according to claim 7, wherein the selection range specification section divides the photographic image displayed on the display screen into a plurality of areas; and wherein the selection range is at least one of the plurality of areas specified by the pointing device from the plurality of areas.

9. The information processing apparatus according to claim 7, further comprising:

a spot information registration control section for registering information of a spot, which user desires to register, wherein the image data acquired by the image data acquisition section is contained in data registered as the information of the spot.

10. The information processing apparatus according to claim 7, wherein the image data storage section stores:

the image data of the photographic images of each spot in response to various conditions; and condition data indicating the various conditions related to the image data;

wherein the image data acquisition section acquires:

a plurality of image data of the photographic images of each spot in response to the various conditions; and the condition data; and wherein the display control section controls the display unit to display the photographic image of the image data acquired by the image data acquisition section on the display screen based on a condition at a predetermined time and the condition data.

11. The information processing apparatus according to claim 7, wherein the display control section changes a display mode of the photographic image based on a correlation between the position of the information processing apparatus on the road map and the predetermined position.

12. An information processing apparatus comprising:

an image data storage section for storing image data of a photographic image;

a display unit having a display screen;

a display control section for controlling the display unit to display the photographic image on the display screen based on the image data;

an image display position data storage section for storing image display position data indicating positions where photographic images of spots are to be displayed;

a pointing device for allowing a user to input coordinate position data on the display screen;

a spot calculation section for obtaining a spot specified by the pointing device based on the image display position data and the coordinate position data;

an image data acquisition section for acquiring the image data of the photographic image of the spot obtained by the spot calculation section, based on the position obtained by the spot calculation section to create a photographic icon corresponding to the photographic image as a spot location; and a road map data storage section for storing road map data wherein:

the display control section controls the display unit to display a registration screen for determining whether the photographic icon is registered or not;

the image data storage section further stores link data so that the image data is linked to the road map data stored by the road map data storage section; and the image data acquisition section acquires the link data when the image data acquisition section acquires the image data, wherein the display control section controls the display unit to display a road map and a position of the information processing apparatus on the display screen based on the road map data;

wherein the display control section controls the display unit to display, as the spot location, the photographic data of the image data acquired by the second image data acquisition section at a predetermined position on the road map.

13. The information processing apparatus according to claim 12, further comprising:

a spot information registration control section for registering information of a spot, which user desires to register, wherein the image data acquired by the image data acquisition section is contained in data registered as the information of the spot.

14. The information processing apparatus according to claim 12,
- wherein the image data storage section stores:
  - the image data of the photographic images of each spot in response to various conditions; and
  - condition data indicating the various conditions related to the image data;
- wherein the image data acquisition section acquires:
  - a plurality of image data of the photographic images of each spot in response to the various conditions; and
  - the condition data; and
- wherein the display control section controls the display unit to display the photographic image of the image data acquired by the image data acquisition section on the display screen based on a condition at a predetermined time and the condition data.

15. The information processing apparatus according to claim 12,
- wherein the display control section changes a display mode of the photographic image based on a correlation between the position of the information processing apparatus on the road map and the predetermined position.

\* \* \* \* \*

UNITED STATES PATENT AND TRADEMARK OFFICE
CERTIFICATE OF CORRECTION

| | | |
|---|---|---|
| PATENT NO. | : 7,665,040 B2 | Page 1 of 1 |
| APPLICATION NO. | : 10/382643 | |
| DATED | : February 16, 2010 | |
| INVENTOR(S) | : Shigeo Nakamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Twenty-eighth Day of December, 2010

David J. Kappos
*Director of the United States Patent and Trademark Office*